Patented Sept. 20, 1949

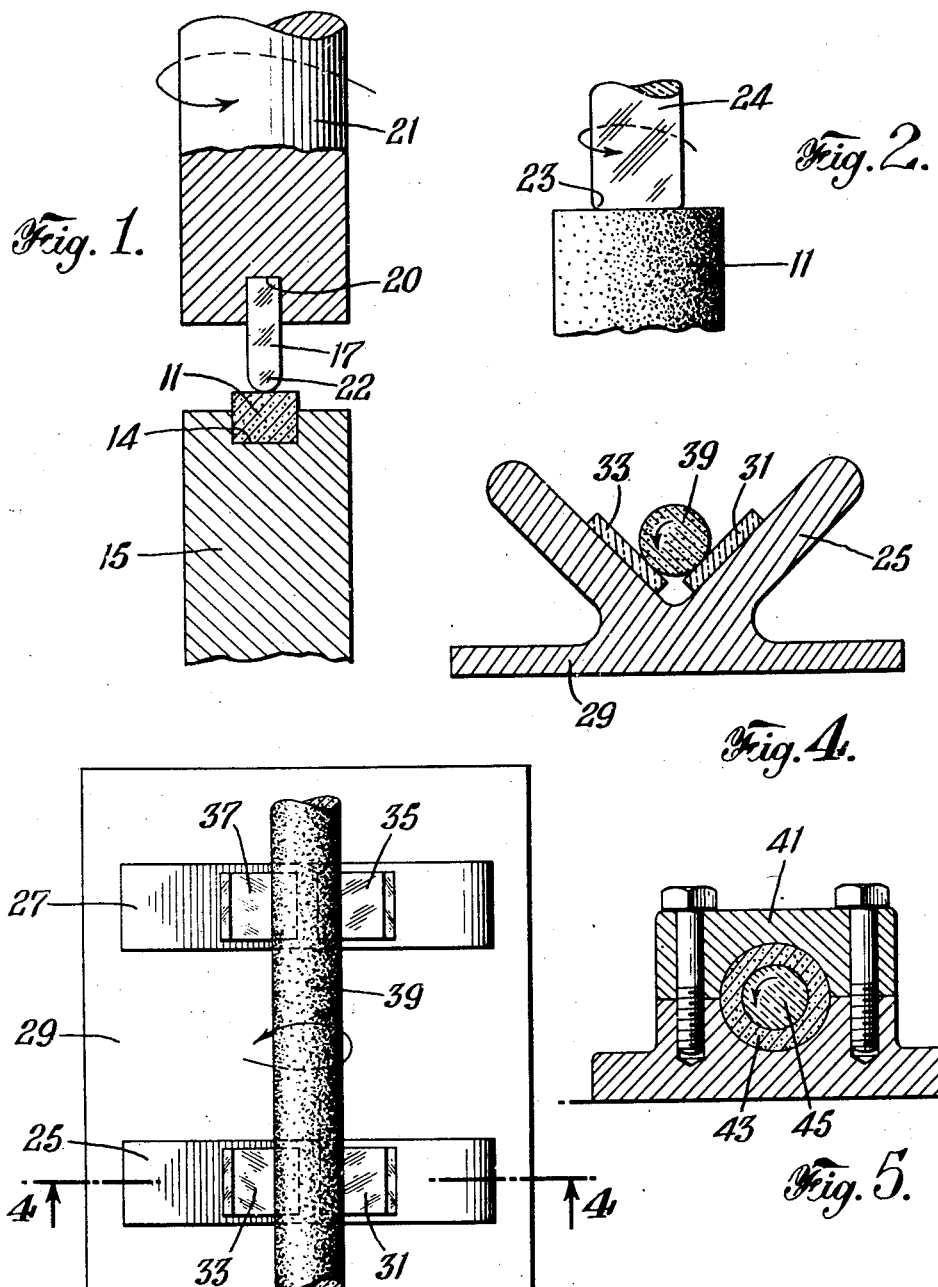

2,482,205

UNITED STATES PATENT OFFICE 2,482,205

BEARING

Lawrence D. Potts, Kenmore, N. Y., assignor to The Linde Air Products Company, a corporation of Ohio Application February 14, 1945, Serial No. 577,758

9 Claims. (Cl. 308—238)

1

This invention relates to bearings, and more particularly to a novel combination of bearing and shaft materials.

Among the objects of the invention are the provision of a novel bearing and shaft combination which can be operated successfully at high speed without lubrication, yet with a small wear rate and low frictional drag; the provision of such a bearing and shaft combination which can be operated successfully at high speed under conditions precluding or hindering the use of lubricants, as in a corrosive atmosphere, or at high temperatures, or at temperatures fluctuating between very high and low extremes outside the viscosity range of any one lubricant, or in a vacuum; and the provision of a compact thrust bearing having a high load carrying capacity.

In the drawings,

Fig. 1 is a side elevational view, partly broken away and in section, showing a pivot type thrust bearing embodying the invention;

Fig. 2 is a side elevational view of a part of a modified form of pivot type thrust bearing;

Fig. 3 is a plan view showing a shaft arranged for rotation in radial bearings;

Fig. 4 is a cross-sectional view taken along the line 4—4 of Fig. 3; and

Fig. 5 is a cross-sectional view of a modified form of radial bearing.

In accordance with the invention, there is provided the combination of a bearing member and a rotatable shaft member engaging the bearing member, in which one of the members is carbon and the other of the members is a unicrystalline body of material selected from the group consisting of corundum and magnesia-alumina spinel.

Tests have shown, surprisingly, that sustained rapid rotational movement can be effected between a carbon bearing member and a unicrystalline corundum or spinel bearing member in contact therewith without the need of employing a lubricant to reduce wear and frictional drag. Bearings of this type are advantageous for use at high speeds in corrosive atmospheres which cause the deterioration of lubricants, under temperature conditions which are above or below the temperatures at which lubricants can be used successfully, under conditions of temperature which fluctuate so widely that lubricants cannot be used, or in an evacuated chamber in which lubrication is difficult. In these tests, the carbon bearing member was a compacted body pressed from a powdered carbonaceous black having a specific gravity less than three, such as lamp black, and

2 subsequently baked at a temperature below the graphitizing range to retain most of the carbon in an amorphous state. It is immaterial as far as the principles of the invention are concerned whether the stationary bearing member is made of carbon and the rotating shaft is made of jewel material such as corundum or spinel, or vice versa.

In the pivot type thrust bearing shown in Fig. 1, a carbon disc 11 is mounted in a recess 14 in the top of a stationary support 15. Engaging the carbon disc 11 for rotation thereon is a cylindrical pivot 17 of spinel or corundum mounted in a cavity 20 in the lower end of a rotatable shaft 21. As shown in Fig. 1, the nose 22 of the pivot 17 is a convex surface of revolution which is highly polished either by a flame or by mechanical means. Other axially symmetrical shapes also can be used successfully, such as the flat end having a rounded edge 23 shown on the pivot 24 in Fig. 2. Successful results have also been obtained when the stationary bearing member 11 is spinel or corundum and the rotating pivots 17 or 24 are carbon.

In one test, a rotating carbon pivot 17 having a nose radius of two inches was operated at 10,000 R. P. M. for six hours without lubrication on a flat spinel bearing disc 11 under a load of 10 pounds.

In another test without lubrication, lasting for 86 hours, a 21 pound thrust load was impressed on a carbon disc 11 by a 0.150 inch diameter pivot 17 of clear sapphire (a form of corundum) having a 0.125 inch nose radius and rotating at 10,000 R. P. M. These conditions correspond to a mean bearing pressure of 1185 lbs./sq. in., maximum and mean rubbing velocities of 396 and 198 ft./min., respectively, and maximum and mean PV values of 470,000 and 235,000 ft. lbs./min. sq. in., respectively. The mean wear rate into the carbon was 0.00055 in./hr. Such a mean rate is faster than would be obtained in conventional lubricated bearings, but is acceptably low for many applications where the need for operating without a lubricant justifies unusual expedients. Wear on the sapphire pivot was too slight to measure. During operation, the jewel pivot usually glowed a dull red, indicating that localized surface temperatures above 500° C. were obtained. In an identical test, using a spinel pivot 17 instead of a sapphire pivot, similar results were obtained. In comparative tests sapphire pivots wore into several hard and soft metals faster than they wore into carbon, and the wear on the sapphire pivots was appreciable.

In contrast to the foregoing result, the maximum and mean PV values permissible in ordinary lubricated thrust bearings are 28,000 and 14,000 ft. lbs./min. sq. in., respectively, at speeds of 200 to 400 ft./min. according to Kent's Mechanical Engineers' Handbook of Design and Shop Practice, 11th ed.

The jewel carbon thrust bearing performance described above is remarkable when it is considered that ordinary metal to metal thrust bearings gall quickly when operated without lubrication and soon become inoperative. It is especially remarkable, also, because a load of 21 pounds is unusually high even for a lubricated bearing of such small size operating at such a high speed.

In the radial bearing shown in Figs. 3 and 4 two spaced-apart aligned V-shaped cradle supports 25 and 27 project upwardly from a bed plate 29 and support bearing segments 31, 33, 35 and 37, which are cemented or otherwise secured to the arms of the cradles in proper alignment to support a horizontal shaft 39.

In all tests which were run on this type of radial bearing a 1.7 pound carbon shaft 39 was rotated at 10,000 R. P. M. without lubrication on spinel or sapphire segments about one-half inch wide. No wear whatsoever occurred on the sapphire segments, and the carbon shaft wore only .0004 inch radially in 28 hours of continuous operation. A carbon shaft 39 operating on spinel segments was slightly less worn after 28 hours of operation without lubrication, and the spinel segments themselves were not worn at all.

Another type of radial bearing, as shown in Fig. 5, comprises a pillow block 41 carrying a carbon sleeve 43 in which is journalled a shaft 45 of jewel material, such as spinel or sapphire.

The foregoing description has emphasized the advantages of the bearings of the present invention when no lubricant is employed. It is to be understood, however, that such bearings are also suitable for operation with lubricants. For example, liquid or solid lubricants such as natural and synthetic waxes or resins can be added to the carbon to increase wear resistance. Also, the principles of the invention have been explained as applied to simple types of bearings for illustration only. It is to be understood that the principles are applicable to other more complex bearings, as well as to bearings of special design such as the Kingsbury type thrust bearing, or to V bearings for small motors which by operating at the high temperatures permitted by jewel-carbon bearings can exert more power per unit weight than was possible heretofore.

I claim:

1. In combination, a bearing member, and a shaft member engaging said bearing member, one of said members being formed from a compacted carbonaceous black and the other of said members being a unicrystalline body of corundum.

2. In combination, a bearing member, and a shaft member engaging said bearing member, one of said members being formed from a compacted carbonaceous black and the other of said members being a unicrystalline body of spinel.

3. In combination, a bearing member, and a shaft member engaging said bearing member, one of said members being formed from a compacted carbonaceous black and the other of said members being a unicrystalline body of material selected from the group consisting of corundum and spinel.

4. In combination, a bearing member formed from a compacted carbonaceous black, and a shaft member engaging said bearing member, said shaft member being a unicrystalline body of material selected from the group consisting of spinel and corundum.

5. In combination, a bearing member comprising a unicrystalline body of material selected from the group consisting of spinel and corundum, and a shaft member formed from a compacted carbonaceous black engaging said bearing member.

6. A thrust bearing comprising a bearing member, and a pivot member having an end surface engaging said bearing member, one of said members being a compact body of carbonaceous black having a specific gravity less than 3, and the other of said members being a unicrystalline body of corundum.

7. A thrust bearing comprising a bearing member, and a pivot member having an end surface engaging said bearing member, one of said members being a compact body of carbonaceous black having a specific gravity less than 3, and the other of said members being a unicrystalline body of spinel.

8. A radial bearing comprising a bearing member and a cylindrical shaft member having a peripheral surface engaging said bearing member, one of said members being a compact body of a carbonaceous black having a specific gravity less than 3, and the other of said members being a unicrystalline body of corundum.

9. A radial bearing comprising a bearing member and a cylindrical shaft having a peripheral surface engaging said bearing member one of said members being a compact body of a carbonaceous black having a specific gravity less than 3, and the other of said members being a unicrystalline body of spinel.

LAWRENCE D. POTTS.

REFERENCES CITED

The following references are of record in the file of this patent:

UNITED STATES PATENTS

| Number | Name | Date |
| --- | --- | --- |
| 300,024 | Smalley | June 10, 1884 |
| 499,012 | Cooper | June 6, 1893 |
| 499,334 | Shallenberger | June 13, 1893 |
| 811,323 | Porter | Jan. 30, 1906 |
| 1,975,646 | Luthy | Oct. 2, 1934 |
| 2,041,896 | McQueer | May 26, 1936 |
| 2,048,708 | Pfanstichl | July 28, 1936 |

FOREIGN PATENTS

| Number | Country | Date |
| --- | --- | --- |
| 305,218 | Great Britain | Jan. 21, 1932 |